United States Patent Office 2,843,548
Patented July 15, 1958

2,843,548

RUST PREVENTIVE AVIATION OIL

Roy A. Westlund, Jr., Linden, and Robert W. Scott, Westfield, N. J., assignor to Esso Research and Engineering Company, a corporation of Delaware No Drawing. Application October 1, 1954
Serial No. 459,849

1 Claim. (Cl. 252—56)

This invention relates to lubricants and more particularly relates to a novel lubricant composition which acts as an engine lubricant at normal engine operating temperatures and which gels to a plastic-type rust preventive upon cooling.

In the aviation industry it is frequently necessary to store aviation engines for extended periods of time. This storage may be occasioned by the temporary retirement from service of the aircraft, long periods of delay prior to engine overhaul, or for numerous other reasons. In the case of military aircraft, for example, the storage period may extend for several years.

It is apparent, therefore, that during these extended periods of storage, it is necessary to protect the engine parts from rusting and other types of corrosion. Although numerous rust preventive compositions have been suggested in the prior art, they have for one reason or another not been entirely adequate to satisfy all of the requirements which are desired. More specifically, certain prior art rust preventives, although providing adequate rust and corrosion protection, have required considerable effort and delay in their removal from the engines prior to the reuse of these engines because of their "thick" consistency. On the other hand, prior art formulations which are adapted to be readily removed from the engine prior to reuse, or which are not required to be removed prior to reuse, are generally of a "thin" consistency and therefore tend to drain from the engine parts on storage and thus leave portions of the engine unprotected, resulting in rusting and other types of corrosion.

A novel lubricant composition has now been found which acts as an engine lubricant at normal engine operating temperatures and which gels to a plastic-type rust preventive upon cooling. This novel composition of the present invention comprises a major proportion of a mineral lubricating oil, about 1 to 10% by weight based on the total composition of an organic polymer having viscosity index improving properties, the combination of said lubricating oil and said polymer having a viscosity in the range of about 90 to 150 SSU at 210° F., about 6 to 15% by weight based on the total composition of a micro-crystalline wax having a melting point in the range of about 155° F. to 205° F., and about 1 to 6% by weight based on the total composition of a rust inhibitor.

In utilizing the lubricant composition of the present invention in an aviation engine, the lubricant composition is added to the aviation engine after removal of the bulk of the normal or regular aviation oil from the engine crankcase. The aviation engine is then run for a short period of time to assure distribution of the lubricant composition throughout the engine. Thereafter, the aviation engine crankcase is drained to remove the bulk of the lubricant composition therefrom. It will be understood that a sufficient quantity of the lubricant composition adheres to the engine parts so that upon cooling, the novel composition of this invention gels to a plastic-type film or coating.

The lubricant composition of this invention exhibits a number of outstanding features. To begin with, upon cooling, the plastic-type film covering the engine parts remains as such indefinitely and does not drain away or evaporate, which would result in exposure of various engine parts. The protective film of the lubricant composition protects the engine parts not only from rusting but also prevents other corrosion such as that which might occur from traces of brominated scavenging agents remaining in the engine. The lubricant composition of this invention retains the property of setting to a gel even if diluted with large portions of a regular aviation oil. Thus, when the present lubricant composition is employed in aviation engines, it is unnecessary to remove the regular aviation oil completely prior to the application of the present composition. Another feature of the present lubricant composition is that the protective film which is formed does not gel to such a thickness as would require its removal prior to reuse of the aviation engine. In addition, the lubricant composition of this invention is compatible with a regular aviation oil and is also itself a lubricant at normal aviation engine operating temperatures. Thus when it is desired to return the aviation engine to service, all that is required is to add the regular aviation oil to the engine crankcase.

The mineral lubricating oil employed as the major proportion of the lubricant composition may be a straight mineral lubricating oil or distillate derived from paraffinic, naphthenic, asphaltic, or mixed base crude, or, if desired, various blended oils may be employed as well as residuals, particularly those from which asphaltic constituents have been carefully removed. An especially preferred lubricating oil is a blend of a distillate oil and a residual oil. The oils may be refined by conventional methods using acid alkali and/or clay or other agents such as aluminum chloride, or they may be extracted oils produced, for example, by solvent extraction with solvents of the type of phenol, sulfur dioxide, furfural, dichloro methyl ethyl, nitro benzene, crotonaldehyde, etc. The mineral oils may also be dewaxed by such methods as pressing and solvent dewaxing with methyl ethyl ketone, propane, etc. Hydrogenated oils or white oils may be employed as well as synthetic oils prepared, for example, by the polymerization of olefins or by the reaction of oxides of carbon with hydrogen or by the hydrogenation of coal or its products.

Generally, the lubricating oil portion of the lubricant composition will represent about 69 to 92 weight percent of the total lubricant composition. The viscosity of these lubricating oils will generally be in the range of about 70 to 105 SSU at 210° F. and preferably the lubricating oil constituent has a viscosity index of at least about 85.

The organic polymers having viscosity index improving properties are employed in the present lubricant composition in an amount in the range of about 1 to 10% by weight based on the total composition, and preferably the V. I. (viscosity index) improver is employed in an amount in the range of about 8 to 10% by weight based on the total composition. A preferred viscosity index improver is a high molecular weight hydrocarbon such as an olefin, including the polymerized $C_3$ to $C_5$ olefins. For example, polymerized butenes and preferably polymerized isobutylene having a molecular weight in the range of about 5,000 to 50,000, preferably about 10,000 to 20,000, are useful. These polymerized olefins are readily prepared by procedures well known to the art. Other viscosity index improvers include the polymethacrylate esters, fumarate-vinyl acetate copolymers, polyalkylstyrenes, and the like.

The combination of the lubricating oil and the V. I. improver, in proportions the same as those employed in the total lubricant composition, should have a viscosity in the range of about 90 to 150 SSU at 210° F. This particular viscosity range is critical for aviation engine operation and is necessary in order to assure the operability of the lubricant composition in an aviation engine at operating engine temperatures. If, however, the composition of this invention is to be employed in engines other than aviation engines, it is possible to have a lower or higher viscosity for the oil-V. I. improver combination than the range of 90 to 150 SSU at 210° F. set out above.

The thickener employed in the lubricant composition of this invention is a micro-crystalline wax having a melting point of about 155° F. to 205° F. The micro-crystalline wax is employed in an amount in the lubricant composition in the range of about 6 to 15% by weight based on the total composition and is preferably employed in the range of about 6 to 8% by weight. Preferably the higher melting point micro-crystalline waxes, namely, those having a melting point of about 170° F. to 205° F., are employed in this invention.

Micro-crystalline wax is obtained from the dewaxing of residual oils such as bright stocks and cylinder oils and is distinguishable from crystalline wax which is derived from the dewaxing of predominantly distillate lubricating oil fractions. Crystalline wax generally has a melting point below about 150° F., whereas micro-crystalline wax is generally considered to have a melting point above about 155° F. In general, micro-crystalline wax is produced by de-oiling motor oil petrolatum obtained from the solvent dewaxing of residual oils such as bright stocks and cylinder oils. This de-oiling process, which removes certain low melting point wax constituents as well as the oil from the micro-crystalline wax product, is well known in the art and may be conveniently carried out at low temperatures employing a solvent such as propane. A number of micro-crystalline wax products are available commercially and are sold under trade names such as Tervan 2536, Crown 180, etc.

A number of rust-inhibiting materials may be incorporated into the lubricant composition of this invention in an amount in the range of about 1 to 6% by weight based on the total composition. Examples of such rust preventives include the partial esters of polyhydroxy compounds such as the oleate of sorbitan, polyglycerols, pentaerythritol, etc.; lauryl mercapto-acetic acid; ditriricinoleates; alkyl phosphoric acids; acid phosphates; fatty acid amides such as the mono fatty acid amides of polyamines, e. g., the amides of fatty acids having 12 to 22 carbon atoms per molecule such as lauric, myristic, stearic, oleic, behenic, etc., and amines such as ethylene diamine, propylene diamine, diethylene triamine, etc.; petroleum sulfonates such as calcium petroleum sulfonate, barium petroleum sulfonate, etc. It will be understood that mixtures of such rust inhibitors may also be employed in the present compositions as well as the individual compounds. Sorbitan monooleate and the oleic acid amide of ethylene diamine having the formula

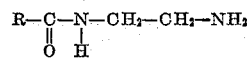

where RCO is derived from oleic acid, are especially prefered as rust inhibitors in the present lubricant compositions.

Other agents than those that have been mentioned above may also be present in small amounts in the lubricant compositions, such as dyes, color stabilizers, antifoaming agents, oiliness agents, pour depresants, extreme pressure agents, and the like.

The following specific examples of this invention are presented to set forth the invention in greater detail, but it will be understood that it is not intended that they limit the invention in any way.

EXAMPLE I

A number of lubricant compositions were prepared and tested to determine their suitability for use in aviation engines as lubricating oils having the desirable characteristics set forth heretofore. Each of the lubricant blends in this example contained a lubricating oil and a micro-crystalline wax, and several of the blends, in addition, contained a viscosity index improver which was a polyisobutylene having a molecular weight of about 14,000. In this series of experiments, the blends did not include a rust inhibitor since characteristics other than rust prevention were being evaluated specifically.

The following base oils were employed in this series of experiments:

Base oil A.—This base oil was a naphthenic-type mineral oil having a viscosity of 38.4 SSU at 210° F.

Base oil B.—This base oil was a naphthenic-type mineral oil having a viscosity of 75.2 SSU at 210° F.

Base oil C.—This base oil was a blend consisting of 50.0 volume percent of base oil B and 50.0 volume percent of a heavy bright stock having a viscosity of 210 SSU at 210° F.

Base oil D.—This base oil was a blend of 48% by weight of oil I, which was a dewaxed distillate mineral lubricating oil having a viscosity of about 50 SSU at 210° F., and 52% by weight of oil II, which was a dewaxed cylinder oil having a viscosity of about 210 SSU at 210° F.

Base oil E.—This base oil was a blend of 60% by weight of oil I and 40% by weight of oil II, which oils have been described above under the heading "base oil D."

The following micro-crystalline waxes were employed in the preparation of the blends:

Wax A.—This micro-crystalline wax had a melting point of about 175° F. and was obtained by de-oiling motor oil petrolatum produced from the dewaxing of cylinder oils and bright stocks. It is sold under the trade name of Tervan 2536.

Wax B.—This micro-crystalline wax had a melting point of about 189° F. and was obtained by deoiling petrolatum produced from solvent dewaxing of cylinder oils and bright stocks. It is sold commercially under the trade name of Crown 180.

The following critical properties were evaluated:

Test 1.—SSU viscosity at 210° F.

It was necessary that the blend of the base oil and the V. I. improver have an SSU viscosity at 210° F. in the range of 90 to 150 in order for the lubricant composition to be used as a lubricant at operating temperatures in an aviation engine. Blends not meeting this particular specification would have to be removed from the engine prior to placing the engine back in service.

Test 2.—Apparent viscosity at 0° F.

The apparent viscosity at 0° F. measured in poises at 20 sec.$^{-1}$ shear rate was determined in order to determine if the lubricant composition would be so viscous after extended periods of storage that the lubricant composition would have to be completely removed from the engine prior to placing the engine back in service. An apparent viscosity at 0° F. of less than about 6500 poises is considered passing in this test.

Test 3.—Flow test

This test was carried out by diluting the lubricant composition with an equal volume of a regular commercial aviation oil, heating the mixture to 205° F. in a test jar for five minutes, cooling the contents of the test jar to 100° F., and then placing the jar on its side. No flow of the contents of the jar in ten seconds passed this test. This particular test indicates the suitability of the lubricant composition for addition to engines containing retained regular aviation oil, since lubricant compositions failing this test would tend to drain from the engine parts on storage and leave portions of the engine unprotected.

The following blends were prepared and gave the following results in the aforementioned tests:

TABLE I

| Blend | Base Oil in Blend | | Percent VI Improver[1] in Blend | SSU at 210° F. of Base Oil Plus VI Improver | Wax in Blend | | Apparent Vis. of Blend at 0° F. (Poises at 20 sec.-1 shear rate) | Flow Test |
|---|---|---|---|---|---|---|---|---|
| | Type | Percent of Blend | | | Type | Percent of Blend | | |
| 1 | A | 90.0 | | 38.4 | A | 10.0 | 150 | Pass. |
| 2 | B | 95.0 | | 75.2 | A | 5.0 | 3,600 | Fail. |
| 3 | B | 90.0 | | 75.2 | A | 10.0 | 7,100 | Pass. |
| 4 | C | 90.0 | | 110.5 | A | 10.0 | 16,000 | Pass. |
| 5 | D | 81.0 | 9.0 | 152.3 | A | 10.0 | 6,100 | Pass. |
| 6 | D | 85.5 | 4.5 | 120.7 | A | 10.0 | 6,200 | Pass. |
| 7 | E | 81.0 | 9.0 | 123.7 | B | 10.0 | <4,000 | Pass. |
| 8 | E | 84.6 | 9.4 | 123.7 | B | 6.0 | <4,000 | Pass. |

[1] Polyisobutylene (M. W.=approx. 14,000).

EXAMPLE II

The following two compositions were prepared in accordance with the present invention:

TABLE II

| Component | Component Concentration, Weight, Percent | |
|---|---|---|
| | Composition A | Composition B |
| Base Stock E | 79.0 | 81.0 |
| Polyisobutylene (M. W.=approx. 14,000) | 9.0 | 9.0 |
| Wax B | 7.0 | 7.0 |
| Sorbitan Monooleate | 5.0 | |
| Oleic Acid Amide of Ethylene Diamine | | 3.0 |
| | 100.0 | 100.0 |

These two compositions were evaluated in Tests 1, 2, and 3, and were further evaluated in the following tests.

*Test 4.—JAN–H–792 humidity cabinet test*

This test is carried out by dipping polished steel panels in the lubricant compositions at 205° F., storing 4 hours at 77° F., and 20 hours at 140° F., and placing the dipped steel panels in a humidity cabinet maintained at a temperature of 120° F. and 100% humidity.

*Test 5.—HBr neutralization test*

This test was carried out by dipping a polished steel panel in an emulsion of 10% by volume of a 0.20% HBr aqueous solution in a regular aviation oil, then dipping the steel panel in the lubricant composition for 1 minute, draining for two hours, and subsequently hanging the steel panel in a humidity cabinet maintained at 100% humidity and 120° F. for 24 hours. No rusting passed this test. The following results were obtained in these five tests:

TABLE III

| Test | Composition A | Composition B |
|---|---|---|
| 1. S. S. U. at 210° F. of Base Oil plus VI Improver | 115.4 | 121.9 |
| 2. Apparent Viscosity at 0° F. (poises at 20 sec.-1 shear rate) | 2,900 | 3,600 |
| 3. Flow Test | Pass | Pass |
| 4. Humidity Cabinet Life (Hours) | 1,400+ | 1,400+ |
| 5. HBr Neutralization Test | Pass | Pass |

The results of these tests as shown in Table III indicate that composition A and composition B are excellent rust preventive aviation oils. More specifically, it will be noted (1) that their viscosity is such that they may be employed as engine lubricants at normal engine operating temperatures; (2) that their low temperature properties are such that they will remain as a plastic film protecting the engine parts over extended periods of time without draining and yet not be so thick and viscous that they need be removed from the engine parts prior to reuse of the engine; and (3) that they provide excellent rust prevention and corrosion prevention properties.

What is claimed is:

An aviation engine lubricant composition consisting essentially of about 79 wt. percent of a base oil, obtained by blending 60% by weight of a dewaxed distillate mineral lubricating oil having a viscosity of 50 S. S. U. at 210° F., and 40% by weight of a dewaxed cylinder oil having a viscosity of about 210 S. S. U. at 210° F.; about 9 wt. percent of polyisobutylene having a molecular weight of approximately 14,000, the combination of said mineral lubricating oil and said polyisobutylene having a viscosity of about 115 S. S. U. at 210° F.; about 7 wt. percent of a microcrystalline wax having a melting point of about 189° F. obtained by de-oiling petrolatum produced from solvent dewaxing of cylinder oils and bright stocks; and about 5 wt. percent of sorbitan monooleate.

References Cited in the file of this patent

UNITED STATES PATENTS

| 2,340,996 | Smyers | Feb. 8, 1944 |
| 2,403,293 | Miskel | July 2, 1946 |
| 2,564,423 | Barnum | Aug. 14, 1951 |
| 2,632,709 | Schiermeier | Mar. 24, 1953 |
| 2,648,643 | Adams | Aug. 11, 1953 |
| 2,716,611 | Paxton | Aug. 30, 1955 |